United States Patent
Curbelo

Patent Number: 5,835,213
Date of Patent: Nov. 10, 1998

[54] TRIPLE MODULATION EXPERIMENT FOR A FOURIER TRANSFORM SPECTROMETER

[75] Inventor: Raul Curbelo, Lexington, Mass.

[73] Assignee: Bio-Rad Laboratories, Inc., Hercules, Calif.

[21] Appl. No.: 712,940

[22] Filed: Sep. 13, 1996

[51] Int. Cl.⁶ .................................................. G01B 9/02
[52] U.S. Cl. ........................................................ 356/346
[58] Field of Search ..................................... 356/345–346

[56] References Cited

U.S. PATENT DOCUMENTS 5,450,196   9/1995   Turner ..................................... 356/346

Primary Examiner—Frank G. Font
Assistant Examiner—Jason D. Vierra-Eisenberg
Attorney, Agent, or Firm—Philip H. Albert; Townsend and Townsend and Crew, LLP

[57] ABSTRACT

For a step-scanning Fourier transform spectrometer comprising an interferometer, a detector, and a digital signal processor (DSP), a method for measuring a response of a sample to multiple modulations is disclosed. In one embodiment, the method comprises the steps of utilizing the DSP to measure a phase modulation angle and a sample modulation angle; obtain an interferogram that corresponds to a calibrated static sample response by using the measured phase modulation rotation angle; obtain another interferogram which corresponds to the calibrated dynamic sample response by using both the measured phase and sample modulation rotation angles; and computing one or more spectra from the interferograms which indicates the calibrated response of said sample to the multiple modulations.

7 Claims, 5 Drawing Sheets

TRIPLE MODULATION EXPERIMENT FOR A FOURIER TRANSFORM SPECTROMETER

BACKGROUND OF THE INVENTION

The present invention relates generally to signal processing, and more specifically to digital signal processing techniques for processing signals recovered from a Fourier transform spectrometer.

Fourier Transform Infrared (FT-IR) Spectroscopy is a technique employed to characterize and/or identify organic or inorganic compounds in a sample material. The technique involves use of a Fourier transform spectrometer of the type described U.S. patent application, Ser. No. 08/584,217, for AN IMPROVED DIGITAL SIGNAL PROCESSING TECHNIQUE FOR A FT-IR SPECTROMETER USING MULTIPLE MODULATIONS, which is incorporated here by reference. During a typical experiment, the sample material under test is placed between the output of an interferometer and a detector. The interferometer modulates each frequency component of a broadband IR beam. The modulated broadband IR beam is then focused onto the sample. Each frequency component of the modulated IR beam interacts with the sample in a manner characteristic of the molecules contained therein. The signal received at the detector represents the superposition of all frequency components in the IR beam as modified by the sample. Hence, the spectrum of the detector signal provides a "fingerprint" that identifies the sample's composition.

In a transmission spectroscopy experiment, for example, the sample is such that the infrared beam passes completely through the sample to the detector. Certain frequency components of the modulated IR beam are absorbed by the sample in a manner corresponding to the individual molecules contained therein. The spectrum of the interferogram measured at the detector identifies the molecular structure of the sample by indicating its transmittance (or absorbance) as a function of frequency.

In addition to FT-IR transmission spectroscopy, there are other spectroscopic techniques which employ a Fourier transform spectrometer of the type described above. For example, Fourier transform spectrometers are also used to perform photo-acoustic absorption spectroscopy, and reflection-absorption spectroscopy, among others. The particular FT-IR spectroscopic technique used depends on the nature of the sample, the information sought, and the time available to prepare the sample and conduct the experiment.

In certain applications of FT-IR spectroscopy, it is desirable to measure variations in the spectrum that are produced by an applied sample excitation. Popular examples of such applications include, but are not limited to, dynamic infrared linear dichroism (DIRLD) spectrometry of polymer films, an investigation of the effect of electric fields on the orientation of liquid crystals, and electrochemically modulated FT-IR spectrometry. The particular type of sample excitation used may be any one of a variety of types suitable for causing a dynamic variation in the spectrum of the sample under test. Examples of known sample modulation techniques include, but are not limited to, application of a mechanical strain, application of an electric field, or application of an electrochemical excitation. The particular sample modulation technique employed depends on the nature of the sample and the specific information sought. Generally, the applied sample modulation is driven by a sinusoidal signal, however, other more complex signals—periodic and aperiodic—may also be suitably employed.

FIG. 1 is a block diagram of a conventional step-scanning interferometer configured to measure the dynamic response of a sample to an applied sample modulation signal. The spectrometer 10 includes an interferometer 12 and an infrared detector 22 which are used to perform spectral measurements of a sample 18. Interferometer 12 includes a beam-splitter (not shown), a fixed mirror (not shown), and a movable mirror (not shown). In a step-scanning mode, the movable mirror is translated from one "step location" to the next and stopped, at which time an intensity measurement is taken. This sequence is repeated for each step location until the desired interferogram is acquired. Interferometer 12 is typically a Michelson interferometer, however, other types of interferometers may be suitably employed.

The broadband infrared beam is modulated in interferometer 12 by the technique of phase modulation, wherein a first modulation signal, a phase modulation signal, is applied to either the fixed or the moving mirror to dither the optical path length at each desired retardation. This is typically by an amount corresponding to $\pm 90°$ of phase shift of the shortest wavelength in the spectral range of interest ($103°$ is optimum).

The phase-modulated beam is then passed through sample 18. A sample excitation driven by a second modulation signal, a sample modulation signal, is applied to sample 18 to measure the effect of the sample excitation on the sample. The output of detector 22 provides the interferogram signal at the current step modulated by the phase and sample modulations. For each step location, the detector output is sampled at fixed intervals of time. The digitized data is then demodulated by a first lock-in amplifier (LIA) 24 and a second LIA 26 to yield a value which, when combined with the values calculated at all step locations, forms the desired interferogram.

A signal generator 14 supplies a step signal, $\omega st$, which is applied to the control electronics of the moving mirror (not shown) to cause the mirror to "step" from one optical retardation to another at the desired step frequency. A signal generator 16 supplies the phase modulation signal, $\omega \phi$, which is applied to either the fixed or the moving mirror to cause it to dither about the retardation location.

Signal generator 20 supplies the sample modulation signal, $\omega s$, which drives the sample excitation of sample 18. The particular type sample excitation employed depends on the nature of the sample and the type of information desired.

LIA 24 synchronously demodulates the output of infrared detector 20 at the phase modulation frequency, $f\phi$, to provide a value of a first interferogram at the given retardation, and a signal that includes the information due to the sample modulation. LIA 26 is tuned to the sample modulation frequency, fs, and further demodulates the output of LIA 24 to provide the value of a second interferogram at the given retardation. The second interferogram is the response of the sample to the sample excitation.

For each interferometer step, analog-to-digital (A/D) convertor 28 samples and digitizes the demodulated signal value, and spectrometer computer 30 calculates the fast Fourier transform (FFT) of the digitized signal to yield the desired spectrum. Typically, spectrometer computer 30 is a general purpose digital computer; however, other devices for performing digital data processing may also be suitably employed.

Each of the LIAs described above is characterized by an output time constant, $\tau$. To discriminate against the transient signal introduced when the movable mirror translates from one step location to the other, sampling by A/D convertor 28 must be delayed by many time constants (e.g., as much as 10 $\tau$) before a measurement can be taken. As a result, the time required to measure the interferogram with the LIAs described above is often excessively long.

SUMMARY OF THE INVENTION

The present invention provides a method and apparatus for measuring the response of a sample to multiple modulations in a step-scanning Fourier transform spectrometer which overcome the shortcomings of the prior art.

According to one aspect of the present invention, it provides a Fourier transform spectrometer for measuring a response of a sample to multiple modulations in which the conventional LIAs are replaced by a single digital signal processor (DSP). As will be described in the following, use of a DSP provides many advantages and benefits over the prior art apparatus employing conventional LIAs, including, but not limited to, 1) avoiding the measurement delay attributable to the LIA time-constants, so that 100% of the available time for measuring is used, thereby obtaining the maximum signal to noise ratio; and 2) ease of setup, due to the fact that the software can be tailored to provide the optimized parameters for the experiment.

According to another aspect of the present invention, it provides a method for measuring a response of a sample to multiple modulations which takes advantage of the unique features of the DSP. In particular, it provides a method for utilizing the inherent speed of a DSP to calibrate the FT-IR spectrometer before obtaining actual measurements. This results in improved performance of the FT-IR spectrometer in measuring the response of a sample to multiple modulations. More specifically, it provides a method for measuring a response of a sample to multiple modulations comprising the steps of 1) measuring a phase modulation delay and a sample modulation delay; 2) utilizing the phase modulation delay to compute a calibrated spectrum representing a static response of the sample; and 3) utilizing both the phase modulation delay and the sample modulation delay to compute a calibrated spectrum representing a dynamic response of the sample.

These and other aspects of the present invention will be recognized by those of ordinary skill in the art by reference to the remaining portions of the specification and the attached drawings.

DESCRIPTION OF A PREFERRED EMBODIMENT

Figure 1:
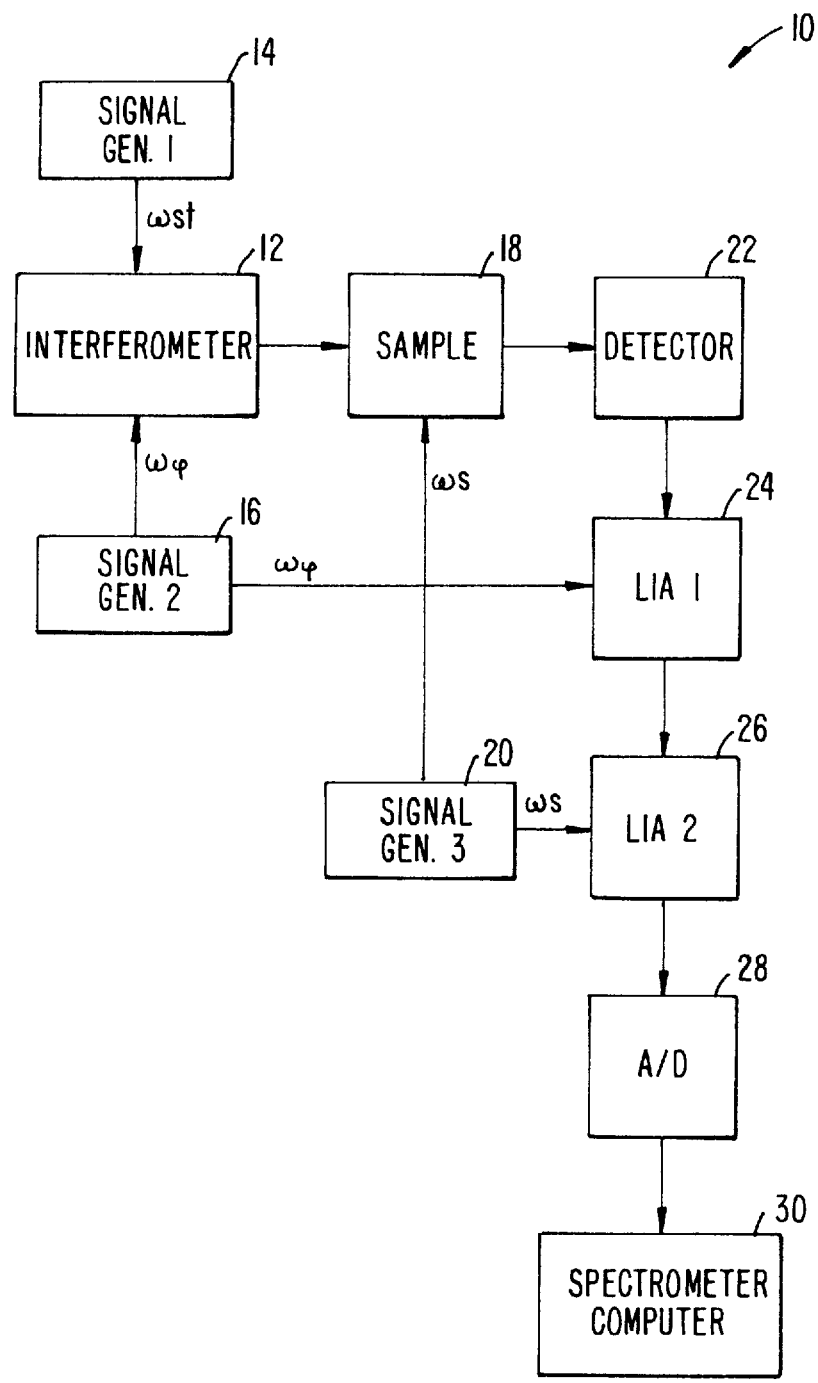
FIG. 1 is a block diagram of a conventional step-scanning interferometer configured to measure the dynamic response of a sample to an applied sample modulation signal which employs two Lock-in Amplifiers (LIAs)
Figure 2:
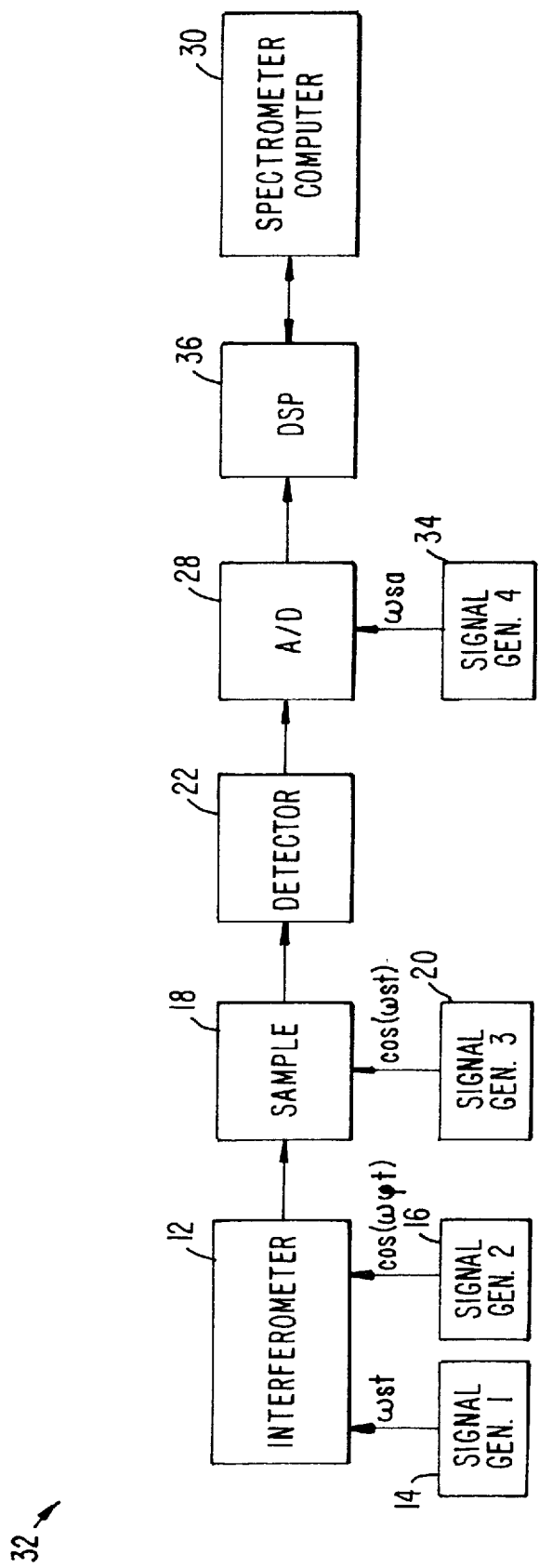
FIG. 2 is a block diagram of a step-scanning Fourier transform spectrometer configured for a triple modulation experiment in which the two LIAs have been replaced by a Digital Signal Processor.

FIG. 2 is a block diagram of a step-scanning Fourier transform spectrometer 32 where the two LIAs in the conventional configuration are replaced by a single digital signal processor (DSP) 36. The spectrometer 32 includes interferometer 12 and infrared detector 22 which perform spectral measurements of sample 18.

Interferometer 12 includes a beamsplitter (not shown), a fixed mirror (not shown), and a movable mirror (not shown). In a step-scanning mode, the movable mirror is translated from one "step location" to the next and stopped, at which time an intensity measurement is taken. This sequence is repeated for each step location until the desired interferogram is acquired. Interferometer 12 is typically a Michelson interferometer, however, other types of interferometers may also be suitably employed.

Modulation of the broadband infrared beam input to interferometer 12 is typically by phase modulation, however, other modulation methods, such as amplitude modulation (e.g., by use of a mechanical chopper), for example, may also be suitably employed. Phase modulation is a technique wherein a first modulation signal, a phase modulation signal, is applied to either the fixed or the moving mirror to dither the optical path length at each desired retardation. This is typically by an amount corresponding to ±90° of phase shift of the shortest wavelength in the spectral range of interest (103° is optimum). The phase modulation signal is typically sinusoidal; however, other more complex signals—both periodic and aperiodic—may also be suitably employed.

The modulated beam is passed through sample 18. A sample excitation driven by a second modulation signal, a sample modulation signal, is applied to sample 18 to measure the effect in the sample spectrum caused by the sample excitation. The output of detector 22 represents a superposition of the intensities of each modulated component of the broadband infrared beam as modified by the modulated sample 18. For each step location, the detector output is sampled at fixed intervals of time. The digitized data is then subjected to one or more Fourier transforms to yield a value which, when combined with values calculated for all step locations, forms one or more desired interferograms.

Signal generator 14 supplies a step signal, $\omega st$, which is applied to the control electronics of the moving mirror (not shown) to cause the mirror to "step" from one optical retardation to another at the desired step frequency. Signal generator 16 supplies a phase modulation signal, $\cos(\omega\phi t)$, which is applied to either the fixed or the moving mirror to cause it to dither about the retardation location.

Signal generator 20 supplies the sample modulation signal, $\cos(\omega st)$, which drives the sample excitation applied to sample 18. The particular type of sample excitation employed depends on the nature of the sample and the type of information desired. For example, the sample excitation may be in the form of an applied mechanical strain, an applied electric field, or an electrochemical excitation. In each case, the purpose of the sample excitation is to measure the effect of the sample excitation on the sample spectrum.

Signal generator 34 supplies a sampling signal, $\omega sa$, to A/D convertor 28 which causes the output of infrared detector 22 to be sampled at a sufficiently high rate (i.e., greater than or equal to the Nyquist rate for the signal). Digital Signal Processor (DSP) 36 synchronously demodulates the output of infrared detector 22 at the phase modulation frequency and the sample modulation frequency to provide a signal corresponding to the value of the interferogram at the given step location as affected by the sample excitation. Spectrometer computer 30 calculates the fast Fourier transform (FFT) of the digitized signal to yield the desired spectrum. Typically, spectrometer computer 30 is a general purpose digital computer that also performs the DSP task; however, other devices for performing digital data processing may also be suitably employed.

Figure 3:
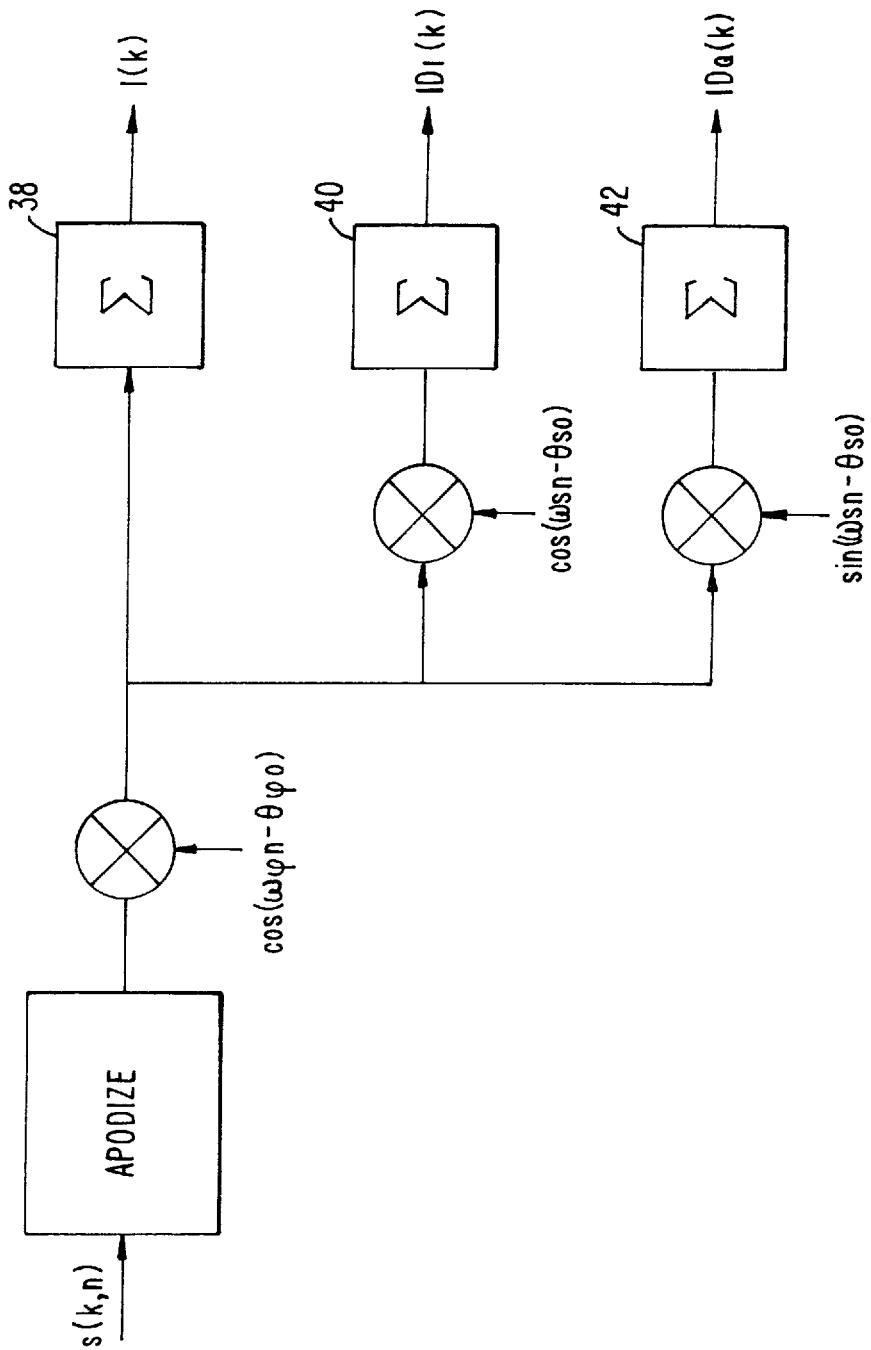
FIG. 3 is a system diagram of a digital signal processing method for deriving the interferograms resulting from the static and dynamic response of sample according to the present invention.

FIG. 3 is a system diagram of a digital signal processing method for computing the value of the interferograms at a given step location for the static and dynamic response of the sample according to the present invention. In order to simplify the explanation, no correction for the effect of step transients (i.e., the transient signal generated when the mirror is moved from one retardation to another) is shown or described in the following. The reader should be aware, however, that a digital signal processing techniques for compensating for the effect of step transients on the measurement has been described in U.S. patent application, Ser. No. 08/584,217, for AN IMPROVED DIGITAL SIGNAL PROCESSING TECHNIQUE FOR A FT-IR SPECTROMETER USING MULTIPLE MODULATIONS.

Referring again to FIG. 3, I(k) is the value of the interferogram at a step k resulting from the sample response to the phase modulation characterized by a phase modulation frequency, $\omega\phi$, where k defines the step index for the given step location of the movable mirror. In a transmission experiment, for example, I(k) over all k is an interferogram that corresponds to the static absorbance of the sample.

To calculate I(k), a digitized detector signal for step k is first apodized to minimize the amplitude of the sidelobes in the spectral domain. In the figure, s(k,n) defines the nth sample of the digitized detector signal for step k. A suitable apodization function may be any function which is unity at n=0 and which decreases with increasing sample index. The apodized detector signal, ŝ(k,n), is then demodulated at the phase modulation frequency by multiplying it by a first carrier signal, $\cos(\omega\phi n-\Theta\phi o)$, corresponding to the phase modulation signal offset by an angle, $\Theta\phi o$, the delay of the digitized detector signal relative to the phase modulation signal, $\cos(\omega\phi t)$ ("phase modulation signal delay" hereinafter). Finally, integrator 38 completes the evaluation of the Discrete Fourier Transform (DFT) to produce the desired value of the interferogram, I(k), at step k.

ID I(k) and ID Q(k) are, respectively, the interferograms which result from the in-phase and quadrature responses of the sample to the sample excitation characterized by a sample modulation frequency, $\omega s$. In a transmission experiment, for example, these interferograms correspond to the in-phase and quadrature components of the dynamic absorbance of the sample. The value of ID I(k) relative to ID Q(k) at each step index, k, reflects the delay between the applied sample excitation having a sample modulation frequency, $\omega s$, and the response of the sample to the sample excitation.

ID I(k) is obtained by multiplying the apodized signal by the first carrier signal, $\cos(\omega\phi-\Theta\phi o)$, and also by a second carrier signal, $\cos(\omega sn-\Theta so)$, representing a signal that is in phase with respect to the sample modulation signal, $\cos(\omega st)$, and offset by an angle, $\Theta so$, the delay of the digitized detector signal relative to the sample modulation signal ("sample modulation signal delay" hereinafter). Integrator 40 completes the evaluation of the DFT to produce a value of the desired interferogram, ID I(k), at step k. ID Q(k) is similarly obtained by multiplying the apodized signal by the first carrier signal, $\cos(\omega\phi n-\Theta\phi o)$, and also by a third carrier signal, $\sin(\omega s-\Theta so)$, representing a signal that is in quadrature with respect to the sample modulation signal, and offset by an angle $\Theta so$. Integrator 42 completes the calculation of the DFT to produce a value of the desired interferogram, ID Q(k), at step k.

The phase modulation signal delay, $\Theta\phi o$, is introduced by time delays in interferometer 12, signal generator 14, and detector electronics 22. Similarly, the sample modulation signal delay, $\Theta so$, is introduced primarily by time delays in the sample modulator (non-shown), signal generator 20, and detector electronics 22. Neither value is known a priori. Therefore, an object of the present invention is a method for measuring these delays and quantifying them, in terms of phase and sample rotations, in order to calibrate the spectrometer for the multiple modulation experiment.

Figure 4:
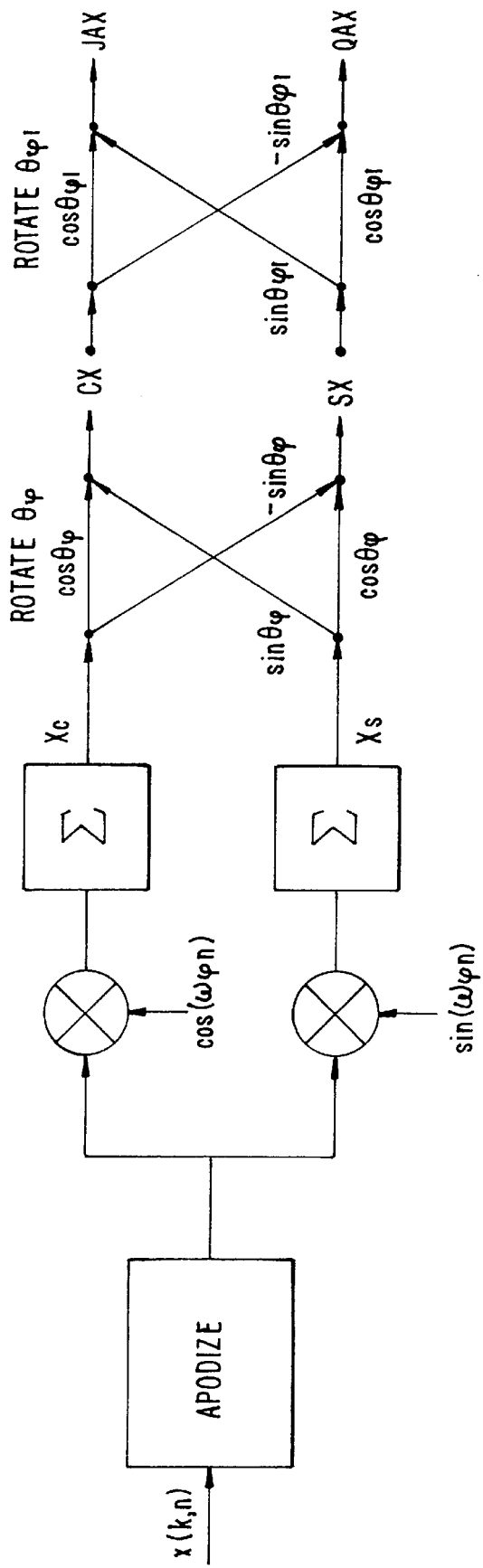
FIG. 4 is a system diagram of a method for determining the delay of the phase modulation signal, $\Theta\phi o$, according to the present invention.

FIG. 4 is a system diagram of a method for determining the phase modulation signal delay, $\Theta\omega o$, according to the present invention. When measuring the phase modulation signal delay, the sample used in spectrometer 32 is any type which produces no additional phase modulation signal delay over the spectral range of interest. In the preferred embodiment of the present invention, no sample was included in spectrometer 32 during measurement of the phase modulation signal delay, $\Theta\phi o$. That is, the sample was simply the open IR beam.

The digitized detector signal, x(k,n), is apodized by any suitable apodization function which approximates unity at n=0 and which decreases with increasing sample index. In the preferred embodiment of the present invention, the apodization function employed is as follows:

$$\hat{x}(k, n) = .5[x(k, n)] \quad \text{for } n = 0$$
$$= x(k, n) \quad \text{for } 0 < n \leq N_2$$
$$= x(k, n)[(1 - (n - N_2)/(N_1 - N_2))] \quad \text{for } N_2 < n \leq N_1$$
$$= 0 \quad \text{for } n > N_1$$

The step index, k, ranges from 0 to M steps, where M is any integer making the number of steps equal to a power of two. A power of two is required to facilitate use of the FFT to compute the spectra of the resulting interferogram. In the preferred embodiment, M is either 127 or 255 to minimize the time for spectrometer calibration step, although other integers may also be suitably employed. The measurement number, n, ranges from 0 to N 1 measurements per step, where N 1 is an integer. The apodization breakpoint, N 2, is also an integer. The foregoing is exemplary only. It should be understood that other apodization function may be substituted without departing from the present invention.

In the preferred embodiment, the values of N 1 and N 2 are chosen so that the frequency response corresponding to the apodization function has zeros at multiples of the sample modulation frequency, $\omega s$, so as to effectively attenuate unwanted demodulation components at those frequencies. At the same time, N 1 and N 2 are large enough so that the summation of integrators 38, 40 and 42 in FIG. 3 and their counterparts in FIGS. 4 and 5 effectively attenuates all unwanted frequency components at higher frequencies. A typical set of values of N 1 and N 2 according to the preferred embodiment are provided in the following table:

| fsHz | fφHz | Scan speed | Filter | Tsa$\mu$sec | $N_1$ | $N_2$ |
|------|------|------------|---------|-------------|-------|-------|
| 40   | 800  | 2 Hz       | 1.2 KHz | 240.5       | 1975  | 1050  |
| 20   | 400  | 1 Hz       | 1.2 KHz | 240.5       | 3950  | 2287  |
| 10   | 400  | 2 sec      | 1.2 KHz | 240.5       | 790   | 4574  |
| 5    | 100  | 4 sec      | 100 Hz  | 2469        | 1539  | 891   |
| 2    | 100  | 10 sec     | 100 Hz  | 2469        | 3848  | 2228  |
| .5   | 100  | 50 sec     | 100 Hz  | 2469        | 19441 | 9721  |

Referring again to FIG. 4, two interferograms are calculated by computing the DFT of the apodized signal as follows:

$$Xc(k) = \Sigma \hat{x}(k,n) \cos(\omega \phi n)$$

$$Xs(k) = \Sigma \hat{x}(k,n) \sin(\omega \phi n)$$

The cosine interferogram, Xc(k), and the sine interferogram, Xs(k) are evaluated for all k between 0 and M, where the summation is for all n between 0 and N 1. These interferograms correspond to the in-phase and quadrature components, respectively, of the system spectral response, and include all the system delays at the phase modulation frequency. Given these interferograms, we quantify the phase modulation signal delay, $\Theta \phi o$, by a two step deterministic process described in the following paragraphs.

First we identify a maximum value for the measured interferograms and assume that it is near the point of stationary phase—an assumption which is valid when the interferograms, Xc and Xs, correspond to a broadband spectrum. The index corresponding to the maximum value, k max, is identified. Second, we quantify the phase modulation signal delay, $\Theta \phi o$, by finding the angle for which the linear orthogonal transformation of Xc and Xs (i.e., rotating the coordinate system of Xc and Xs) provides interferograms IAX and QAX such that the spectrum corresponding to QAX (i.e., the quadrature component) has zero area. Performing the second step without doing the first step can lead to error due to uncertainty about the location of the point of stationary phase. A method for performing the above two steps according to the present invention will now be described.

When the maximum value of the interferograms is near the point of stationary phase, the value of the interferograms, Xc and Xs, at k max is approximately equal to the area under their corresponding spectra. For example, the value of Xs at k max is approximately equal to the area under the quadrature spectrum derived therefrom. In an ideal spectrometer, i.e., having no phase modulation signal delays, Xc is maximum at k max and Xs is zero at k max. Recognizing this fact, we derive a first approximation of the phase modulation signal delay, $\Theta \phi o$, by finding the angle, $\Theta \phi$, for which the linear orthogonal transformation (i.e., rotated coordinate system) of Xc and Xs measured at k max provides a rotated sine component which is zero (i.e., which corresponds approximately to zero area under the quadrature spectrum), and a rotated cosine component which is greater than zero.

More specifically, we determine that interferogram Xc(k) is maximum at some index, kcm, and interferogram Xs(k) is maximum at some index, ksm. These values are designated Xc(kcm) and Xs(ksm), respectively. When Xc(kcm) is greater than or equal to Xs(ksm), we find the angle, $\Theta \phi$, for which $$SX(k)_{at\ kcm} = -Xc(kcm) \sin \Theta \phi + Xs(kcm) \cos \Theta \phi$$

is equal to zero, and $$CX(k)_{at\ kcm} = Xc(kcm) \cos \Theta \phi + Xs(kcm) \sin \Theta \phi$$

is greater than zero. There will be two angles which satisfy the equality, SX(kcm)=0, but only one of those two angles will also satisfy the inequality, CX(kcm)>0.

When, on the other hand, Xc(kcm) is less than Xs(ksm), we find the angle, $\Theta \phi$, for which $$SX(k)_{at\ ksm} = -Xc(ksm) \sin \Theta \phi + Xs(ksm) \cos \Theta \phi$$

is equal to zero, and $$CX(k)_{at\ ksm} = Xc(ksm) \cos \Theta \phi + Xs(ksm) \sin \Theta \phi$$

is greater than zero.

Having computed the first approximation for the phase modulation signal delay, we calculate the rotated interferograms CX(k) and SX(k) for all k between 0 and M as follows:

$$CX(k) = Xc(k) \cos \Theta \phi + Xs(k) \sin \Theta \phi$$

$$SX(k) = -Xc(k) \sin \Theta \phi + Xs(k) \cos \Theta \phi$$

The spectrum of CX(k) is then obtained by the conventional Mertz method to obtain a phase corrected spectrum, CX(v). The spectrum of SX(k), SX(v), is similarly obtained using the centerburst location and the phase spectrum computed for CX. The details of the Mertz method are well-known and, therefore, shall not be provided here. For details of the Mertz method the reader is directed to GRIFFITHS & de HASETH, *Fourier Transform Infrared Spectroscopy*, pp. 109–115, (1986) which is incorporated here by reference.

Next, the area under the two spectra is computed as follows:

$$ACX = \Sigma CX(v) \text{ and } ASX = \Sigma SX(v) \text{ for } v1 \leq v \leq v2$$

where v1 and v2 define the interval that includes most of the energy in the spectrum. For example, in the Mid-IR range, $v1 = 700 \text{ cm}^{-1}$ and $v2 = 4000 \text{ cm}^{-1}$.

We next determine a second approximation of the phase modulation signal delay by finding the angle for which the linear transformation of ACX and ASX provide a rotated quadrature component which is zero (i.e., the area under the quadrature component of the spectrum is zero) and a rotated in-phase component which is greater than zero. That is, we find the angle, $\Theta \phi 1$, for which $$QAX = -ACX \sin \Theta \phi 1 + ASX \cos \Theta \phi 1$$

is equal to zero, and $$IAX = ACX \cos \Theta \phi 1 + ASX \sin \Theta \phi 1$$

is greater than zero. The phase modulation signal delay, $\Theta \phi o$, is simply the sum of the two angles calculated above as follows:

$$\Theta \phi o = \Theta \phi + \Theta \phi 1.$$

Figure 5:
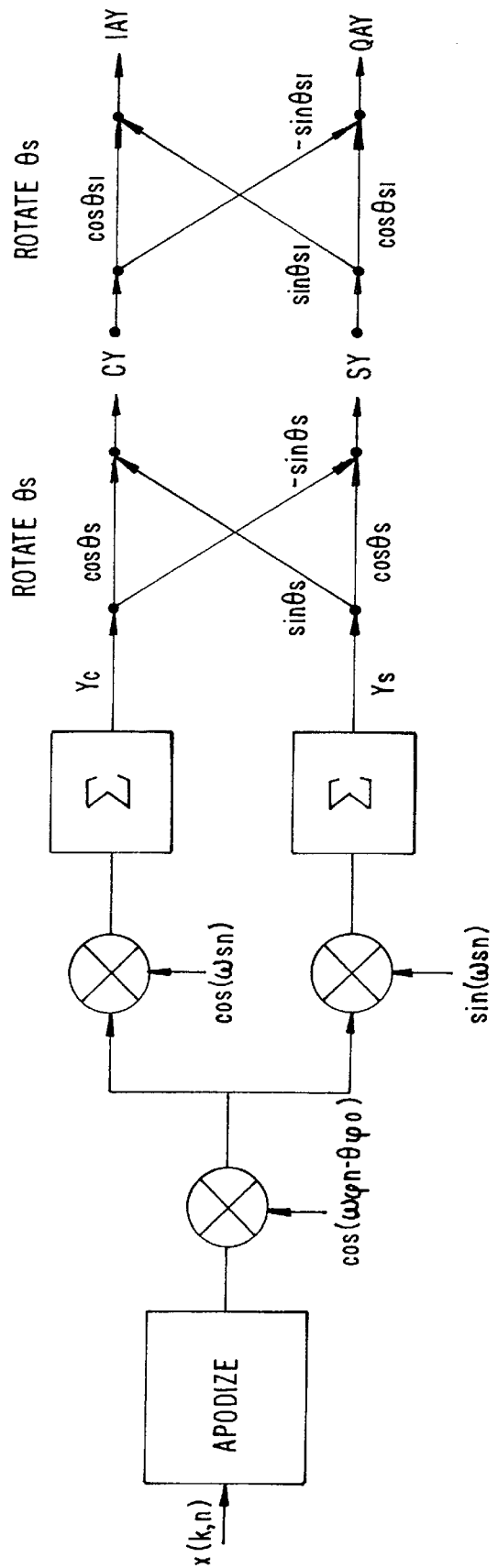
FIG. 5 is a system diagram of a method for determining the delay of the sample modulation signal, $\Theta so$, according to the present invention.

FIG. 5 is a system diagram of a method for determining the sample modulation signal delay according to the present invention. When measuring the sample modulation signal delay, the sample used in spectrometer 32 is any type which produces zero or a known sample modulation signal delay over the spectral range of interest when modulated by the sample modulation signal. In the preferred embodiment of the present invention, the sample used was a solid blade driven by one jaw of a mechanical film stretcher. The preferred sample configuration produces no sample modulation signal delay.

The digitized detector signal, x(k,n), is apodized by an apodization function as described above. Two interferograms, Yc(k) and Ys(k), are calculated by evaluating the DFT of the apodized signal as follows:

$$Yc(k) = \Sigma \hat{x}(k,n) \cos(\omega \phi n - \Theta \phi) \cos(\omega s n)$$

$$Ys(k) = \Sigma \hat{x}(k,n) \sin(\omega \phi n - \Theta \phi) \cos(\omega s n)$$

The cosine interferogram, Yc(k), and the sine interferogram, Ys(k) are computed for all k between 0 and M, for all n between 0 and N1. These interferograms correspond to the system spectral response (assuming zero delay due to the sample) to the phase modulation signal and the sample modulation signal. They include all of the system delays at the sample modulation sidebands of the phase modulation frequency.

Given the above interferograms, we quantify the sample modulation delay, $\Theta so$, by the two step deterministic process described above. The details of this process are provided in the following paragraphs.

We derive a first approximation of the sample modulation signal delay, $\Theta so$, by finding the angle, $\Theta s$, for which the linear orthogonal transformation (i.e., rotate the coordinate system) of Yc and Ys measured at k max provides a rotated sine component which is zero at the maximum (i.e., the area under the quadrature component of the spectrum is zero), and a rotated cosine component which is greater than zero at the maximum.

More specifically, we determine that interferogram Yc(k) is maximum at some index, kcm, and interferogram Ys(k) is maximum at some index, ksm. These values are designated Yc(kcm) and Ys(ksm), respectively. When Yc(kcm) is greater than or equal to Ys(ksm), we find the angle, $\Theta s$, for which $$SY(k)_{at\ kcm} = -Yc(kcm) \sin \Theta s + Ys(kcm) \cos \Theta s$$

is equal to zero, and $$CY(k)_{at\ kcm} = Yc(kcm) \cos \Theta s + Ys(kcm) \sin \Theta s$$

is greater than zero.

When, on the other hand, Yc(kcm) is less than Ys(ksm), we find the angle, $\Theta s$, for which $$SY(k)_{at\ ksm} = -Yc(ksm) \sin \Theta s + Ys(ksm) \cos \Theta s$$

is equal to zero, and $$CY(k)_{at\ ksm} = Yc(ksm) \cos \Theta s + Ys(ksm) \sin \Theta s$$

is greater than zero.

Next, we obtain the rotated interferograms CY(k) and SY(k) for all k between 0 and M as follows:

$$CY(k) = Yc(k) \cos \Theta s + Ys(k) \sin \Theta s$$

$$SY(k) = -Yc(k) \sin \Theta s + Ys(k) \cos \Theta s$$

The spectrum of CY(k) is then obtained by the conventional Mertz method to provide a phase corrected spectrum, CY(v). The spectrum of SY(k), SY(v), is similarly obtained using the centerburst location and the phase spectrum computed for CX.

The area under the two spectra is next computed as follows:

$$ACY = \Sigma CY(v) \text{ and } ASY = \Sigma SY(v) \text{ for } v1 \leq v \leq v2$$

Where v1 and v2 again define the interval that includes most of the energy in the spectrum.

We next find a second approximation of the sample modulation signal delay, $\Theta so$, by finding the angle for which the linear transformation of ACY and ASY provides a rotated quadrature component that is zero and a rotated in-phase component that is greater than zero. That is, we find the angle, $\Theta s1$, for which $$QAY = -ACY \sin \Theta s1 + ASY \cos \Theta s1$$

is equal to zero, and $$IAY = ACY \cos \Theta s1 + ASY \sin \Theta s1$$

is greater than zero. The sample modulation signal delay, $\Theta so$, is the sum of the two angles calculated above:

$$\Theta so = \Theta s + \Theta s1.$$

Referring again to FIG. 3, the interferogram of the static absorbance, I(k), and the in-phase and quadrature interferograms of the dynamic absorbance, ID I(k) and ID Q(k) ate evaluated for collected sample data, s(k,n), by using the values of $\Theta \phi o$ and $\Theta so$ calculated above as follows:

$$I(k) = \Sigma s(k,n) \cos (\omega \phi n - \Theta \phi o)$$

$$ID\ I(k) = \Sigma s(k,n) \cos (\omega \phi n - \Theta \phi o) \cos (\omega sn - \Theta so)$$

$$ID\ Q(k) = \Sigma s(k,n) \cos (\omega \phi n - \Theta \phi o) \sin (\omega sn - \Theta so)$$

where the interferograms are computed for all k between 0 and M steps, and the summation is performed for n between 0 and $N_1$. The spectrum of I(k) is obtained by the conventional Mertz method to obtain a phase corrected spectrum, SA(v). The spectrum of ID I(k) and ID Q(k)—DA I0(v) and DA Q(v), respectively—are similarly obtained using the centerburst location and the phase spectrum computed for I(k). In some cases, it may be desirable to compute the spectrum of ID I(k) using Mertz phase correction and store that phase to compute the spectrum of IDQ(k).

Conclusion:

In conclusion, it can be seen that the present invention provides an improved technique for measuring the effect of multiple modulations on the spectrum derived by a step-scanning Fourier transform spectrometer.

While the above is a complete description of a preferred embodiment of the invention, various modifications, alternative constructions, and equivalents may be used. For example, instead of computing the angle for which the area under the rotated quadrature component of the spectrum is equal to zero, the same result may be obtained by finding the angle for which the root-mean-square (RMS) value of the rotated quadrature component of the spectrum is minimum. Accordingly, the above description should not be taken as limiting the scope of the invention which is defined by the appended claims.

What is claimed is:

1. In a step-scanning Fourier transform spectrometer comprising an interferometer, a detector, and a digital signal processor (DSP), a method for measuring a spectral response of a sample-under-test to multiple modulations, including a phase modulation and a sample modulation, said method comprising the steps of:

measuring, using the DSP, a phase modulation signal delay for the Fourier transform spectrometer; and measuring, using the DSP, a sample modulation signal delay for said Fourier transform spectrometer;

obtaining a first interferogram, I(k), representing a response of the sample-under-test to the phase modulation, wherein said first interferogram is corrected for said phase modulation signal delay;

obtaining a second interferogram, ID I(k), representing an in-phase component of a response of the sample-under-test to the phase modulation and the sample modulation, wherein said second interferogram is corrected for said phase modulation signal delay and said sample modulation signal delay;

obtaining a third interferogram, ID Q(k), representing a quadrature component of a response of the sample-under test to the phase modulation and the sample modulation, wherein said third interferogram is corrected for said phase modulation signal delay and said sample modulation signal delay; and computing one or more spectra from said first, second and third interferograms, said spectra representing the calibrated spectral response of the sample to the multiple modulations.

2. The method of claim 1, wherein said step of measuring a phase modulation signal delay comprises the sub-steps of:

replacing said sample-under-test with a sample producing no additional phase modulation signal delay over a frequency band of interest;

obtaining a first cosine interferogram and a first sine interferogram from the spectrometer representing a response of the spectrometer to the phase modulation signal and including the phase modulation signal delay;

identifying a peak of said first cosine and sine interferograms and assuming that said peak is near a point of stationary phase;

finding an phase modulation delay angle, $\Theta\phi o$, for which a linear orthogonal transformation of said first cosine and sine interferograms brings to zero the area under a quadrature component of a corresponding spectrum.

3. The method of claim 2, wherein said step of measuring a sample modulation signal delay comprises the steps of:

replacing said sample-under-test with a sample producing no additional sample modulation signal delay;

obtaining a second cosine interferogram and a second sine interferogram from the spectrometer representing a response of the spectrometer to the phase modulation and to the sample modulation and including said phase modulation signal delay and said sample modulation signal delay;

identifying a peak of said second cosine and sine interferograms and assuming that said peak is near a point of stationary phase;

finding a sample modulation delay angle, $\Theta so$, for which a linear orthogonal transformation of said second cosine and sine interferograms brings to zero the area under a quadrature component of a corresponding spectrum.

4. The method of claim 3, wherein said step of finding a phase modulation delay angle comprises the sub-steps of:

finding a first angle, $\Theta\phi$, for which a linear orthogonal transformation of said first cosine and sine interferograms measured at an index corresponding to said peak provides a rotated sine component which is zero and a rotated cosine component which is greater than zero;

performing, using said first angle, a linear orthogonal transformation on said first cosine and sine interferograms to provide a rotated cosine interferogram and a rotated sine interferogram;

computing an in-phase spectrum and a quadrature spectrum from said rotated cosine interferogram and said rotated sine interferogram, respectively;

calculating an in-phase spectrum area and a quadrature spectrum area from said in-phase spectrum and said quadrature spectrum, respectively;

finding a second angle, $\Theta\phi 1$, for which a linear orthogonal transformation of said in-phase spectrum area and said quadrature spectrum area brings to zero the area under a rotated quadrature spectrum;

combining said first angle and said second angle to produce said phase modulation delay angle.

5. The method of claim 3, wherein said step of finding a sample modulation delay angle comprises the sub-steps of:

finding a first angle, $\Theta s$, for which a linear orthogonal transformation of said second cosine and sine interferograms measured at an index corresponding to said peak provides a rotated sine component which is zero and a rotated cosine component which is greater than zero;

performing, using said first angle, a linear orthogonal transformation on said second cosine and sine interferograms to provide a rotated cosine interferogram and a rotated sine interferogram;

computing an in-phase spectrum and a quadrature spectrum from said rotated cosine interferogram and said rotated sine interferogram, respectively;

calculating an in-phase spectrum area and a quadrature spectrum area from said in-phase spectrum and said quadrature spectrum, respectively;

finding a second angle, $\Theta s1$, for which a linear orthogonal transformation of said in-phase spectrum area and said quadrature spectrum area brings to zero the area under a rotated quadrature spectrum;

combining said first angle and said second angle to produce a sample modulation delay angle.

6. The method of claim 2, wherein said step of measuring a sample modulation signal delay comprises the steps of:

replacing said sample-under-test with a sample producing no additional sample modulation signal delay;

obtaining a second cosine interferogram and a second sine interferogram from the spectrometer representing a response of the spectrometer to the phase modulation and to the sample modulation and including said phase modulation signal delay and said sample modulation signal delay;

identifying a peak of said second cosine and sine interferograms and assuming that said peak is near a point of stationary phase;

finding a sample modulation delay angle, $\Theta so$, for which a linear orthogonal transformation of said second cosine and sine interferograms brings to a minimum a root-mean-square value of a quadrature component of a corresponding spectrum.

7. The method of claim 1, wherein said step of measuring a phase modulation signal delay comprises the sub-steps of:

replacing said sample-under-test with a sample producing no additional phase modulation signal delay over a frequency band of interest;

obtaining a first cosine interferogram and a first sine interferogram from the spectrometer representing a response of the spectrometer to the phase modulation signal and including the phase modulation signal delay;

identifying a peak of said first cosine and sine interferograms and assuming that said peak is near a point of stationary phase;

finding an phase modulation delay angle, $\Theta\phi o$, for which a linear orthogonal transformation of said first cosine and sine interferograms brings to a minimum the root-mean-square value of a quadrature component of a corresponding spectrum.

* * * * *